(12) United States Patent
Murayama et al.

(10) Patent No.: US 6,240,470 B1
(45) Date of Patent: *May 29, 2001

(54) MAGNETIC DISK CONTROL UNIT, AND FIRMWARE ACTIVE-INTERCHANGE METHOD THEREFOR

(75) Inventors: Takashi Murayama; Shigeru Sakamoto; Katsumi Murai, all of Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/138,425

(22) Filed: Aug. 6, 1998

(30) Foreign Application Priority Data

Feb. 23, 1998 (JP) .................................................. 10-040036

(51) Int. Cl.$^7$ ........................................................ G06F 13/24
(52) U.S. Cl. .............................. 710/48; 710/1; 710/260; 711/4; 711/100
(58) Field of Search ................................... 710/1, 48, 260, 710/267, 261, 269, 200, 240, 36, 39; 711/100, 4

(56) References Cited

U.S. PATENT DOCUMENTS 5,530,845 * 6/1996 Hiatt et al. ............................ 395/500

FOREIGN PATENT DOCUMENTS 5-241815 9/1993 (JP) .
8-328756 12/1996 (JP) .

* cited by examiner

Primary Examiner—Ario Etienne
(74) Attorney, Agent, or Firm—Greer, Burns & Crain, LTD

(57) ABSTRACT

The present invention relates to a magnetic disk control unit which can accomplish active interchange of firmwares. Thus, in this invention, a firmware constituting the magnetic disk control unit includes an internal table area for retaining various data necessary for control, a save area for temporarily saving, of the data in the internal table area, data necessary before and after interchange of the firmware while the firmware undergoes active interchange, a first interruption control section serving, as interruption handling functions, a normal function to refer to the internal table area in accordance with an interruption for advancing to processing to the interruption and a busy response function to perform a busy response to the host unit during the firmware active-interchange, and a second interruption control section serving, as an interruption handling function, only a busy response function to accomplish a busy response to the host unit during the firmware active-interchange. This invention is successfully applicable to systems required to continuously run for 24 hours.

13 Claims, 10 Drawing Sheets

VERSION 1

VERSION 2

VERSION 3

MAGNETIC DISK CONTROL UNIT, AND FIRMWARE ACTIVE-INTERCHANGE METHOD THEREFOR

BACKGROUND OF THE INVENTION

1) Field of the Invention

The present invention relates to a technique applicable to a magnetic disk control unit intervening between a host unit and a magnetic disk unit for executing write/read control in/from the magnetic disk unit in accordance with an input/output signal from the host unit, and more particularly to a magnetic disk control unit incorporating an active-interchange function to interchange, or replace, firmwares during its operation on connection to the host unit, and a firmware active-interchange method to be conducted therein.

2) Description of the Related Art

With reference to FIG. 10, a description will be made hereinbelow of an arrangement of a common magnetic disk control unit and an arrangement of a system including that magnetic disk control unit. As shown in FIG. 10, between a CPU 10 serving as a host unit and a magnetic disk unit 30, there is interposed a magnetic disk control unit (FCU: File Control Unit) 20 which takes charge of write/read control in/from the magnetic disk unit 30 according to an input/output signal (which will sometimes be referred hereinafter to as an I/O) from the CPU 10.

This magnetic disk control unit 20 is composed of CAs (Channel Adapters) 21, a cache memory 22, DAs (Device Adapters) 23, a CFE (Cache Function Engine) 24, a RM (Resource Manager) 25 and a built-in disk 26.

In this arrangement, the CAs 21 are respectively placed in channels for establishing connections between the CPU 10 and the magnetic disk control unit 20, and as will be described herein later, are for conducting processing depending upon an I/O (interruption) from the CPU 10 or an interruption occurring within the magnetic disk control unit 20. In the illustration of FIG. 10, as an example, four channels (paths) are provided between the CPU 10 and the magnetic disk control unit 20.

The cache memory 22 is for temporarily storing data to be written from the CPU 10 into the magnetic disk unit 30 or data to be read out from the magnetic disk unit 30 to the CPU 10, and is under control of the CFE 24.

The DAs 23 are respectively put in paths for setting up connections between the magnetic disk control unit 20 and the magnetic disk unit 30, and conduct access processing to the magnetic disk unit 30, or perform processing for a response from the magnetic disk unit 30 in relation to that access. FIG. 10 illustrates an example in which four paths are placed between the magnetic disk control unit 20 and the magnetic disk unit 30.

The RM 25 acts to manage the whole magnetic disk control unit 20 comprising a plurality of functional modules (numerals 21, 23, 24) mentioned above.

Each of the aforesaid CAs 21, DAs 23, CFE 24 and RM 25 is constructed as a firmware (for example, a microprogram fixedly put through a ROM or the like into a hardware).

The built-in disk 26 is for retaining firmwares constituting the CAs 21, the DAs 23, the CFE 24 and the RM 25, which are written in ROMs on printed-circuit boards (CAs 21, DAs 23, CFE 24 and RM 25) composing the magnetic disk control circuit 20 at the start of the magnetic disk control unit 20. In addition, the built-in disk 26 is made to hold firmwares, for example, corresponding to four generations (four versions), and as will be mentioned herein later, is designed to exchange a firmware in use for a firmware held in this built-in disk 26 at the interchange between firmwares.

For the version-up to deal with functional changes, additions or the like in the above-mentioned magnetic disk control unit 20, the interchange between firmwares has taken place. In a prior art, this firmware interchange has been done in the off-line condition between the CPU 10 and the magnetic disk control unit 20, with the off-line condition being again switched to the on-line condition after the completion of the interchange. Accordingly, the off-line condition remains during the firmware interchange, thus interrupting the system.

However, recently, the system has frequently been required to operate for 24 hours, and therefore, to avoid the system interruption resulting from the off-line condition between the CPU 10 and the magnetic disk control unit 20 at the firmware interchange, there exists an expectation of being able to interchange firmwares without the occurrence of such an off-line condition (that is, while maintaining the on-line condition). Such an interchange to be conducted in a state where the on-line condition remains between the CPU 10 and the magnetic disk control unit 20 is called an active-interchange.

Secondly, a description will be taken hereinbelow of a prior firmware active-interchange method.

In the prior firmware active-interchange method, for accomplishing the firmware interchange in a state where the CPU 10 and the magnetic disk control unit 20 are in the on-line condition, a busy response (reply by a busy signal) takes place from the CAs 21 to the CPU 10 if an I/O comes in from the CPU 10 during the firmware interchange. In such a state, as will be mentioned herein later, a portion of the firmware constituting the CAs 21 is interchanged with the whole firmware (DAs 23, CFE 24 and RM 25) other than CAs 21.

Although the magnetic disk control unit 20 having the active-interchange function for interchanging firmwares during an operation on the connection with the CPU 10 is basically constructed as shown in FIG. 10, in the magnetic disk control unit 20 with the active-interchange function, the CAs 21 are equipped with a busy response function acting during the firmware interchange. Such a firmware structure of the CAs 21 is shown in FIG. 11.

A look at FIG. 11 shows that the prior CAs 21 firmware involves an interruption control section 41, an internal table area 42 and a firmware control section 43.

The interruption control section 41 refers to the contents (a pointer table or the like) of the internal table area 42 in accordance with an interruption (interruption such as an I/O from the CPU 10 and a communication between functional modules in the magnetic disk control unit 20), thereby advancing to an operation by a processing section (function) in the firmware control section 43.

Furthermore, when an I/O comes in from the CPU 10 during the firmware interchange in the magnetic disk control unit 20, the interruption control section 41 refers to the internal table area 42 and gives a busy signal as a reply to the CPU 10, with the reply based on the busy signal being recorded in the internal table area 42.

The internal table area 42 is for the purpose of keeping a variety of data the control needs, and includes a pointer table for indication of addresses of various kinds of functions and a variable table for retention of various kinds of variables for the firmware control section 43. The variable table involves areas, such as (1) an area (a flag representative of that a firmware is in or under interchange, and others) for indicating the situation the firmware itself is presently placed in, (2) an area for storing whether or not a busy signal is given as a replay to the CPU 10, (3) an area for maintaining a path for the connection with the CPU 10 and a physical connection condition, and (4) an area for retaining data for each of the magnetic disk units to be connected to the magnetic disk control unit 20. In this case, the data held in the aforesaid areas (1) to (3) are required to surely exist before and after the firmware interchange.

The firmware control section 43 serves as an area to retain functions for the actual processing (access processing to, or proportionate to, an I/O, communications between functional modules, and others). For the function pointer control in the CAs 21, the values corresponding to the offset positions of various kinds of functions retained in the firmware control section 43 are put in the pointer table of the internal table area 42. Further, the interruption control section 41 reads out a value to the interruption from the pointer table, and reads out the function (processing section) at the offset position corresponding to that value from the firmware control section 43, thereby conducting the processing to the interruption.

In addition, when the firmware is in a ready condition, the firmware control section 43 refers to the internal table area 42 to verify the reply by the busy signal causing the I/O (CPU 10), and sends a CUEND (Control Unit END) as a reply in relation to that I/O.

An operation of the interruption control section 41 will be described hereinbelow with reference to the flow chart (steps S1 to S6) of FIG. 12.

When the magnetic disk control unit 20 is in a ready condition, the firmware operates at a ready-condition processing section within the firmware control section 43. On the occurrence of an interruption, the processing is brought from the ready-condition processing section to the interruption control section 41.

The interruption control section 41 checks whether or not that interruption is I/O processing from the CPU 10 (step S1).

If being not the I/O processing from the CPU 10 (NO route), the interruption is determined as being an interruption, such as inter-functional-module communication processing, which is to end within the magnetic disk control unit 20. In this case, the interruption control section 41 refers to the contents (a pointer table or the like) of the internal table area 42 to conduct an operation by a processing section (other than the I/O processing) dealing with that interruption (step S2). That is, the interruption control section 41, as mentioned before, reads out a value to that interruption from the pointer table of the internal table area 42 and further reads out a function (processing section) at the offset position corresponding to that value from the firmware control section 43, thereby conducting the processing in relation to the interruption.

Incidentally, where the magnetic disk control unit 20 is in a firmware interchange operation, each of the firmwares (functional modules) organizing the magnetic disk control unit 20, off-course, understands the situation in which the firmware interchange is taking place. Accordingly, there is no possibility of the occurrence of an interruption other than the I/O processing during the firmware interchange, and hence, no decision as to whether or not being in the middle of the firmware interchange is made for the interruption undergoing the negative decision in the step S1.

On the other hand, in the case that an interruption coming into existence is the I/O processing from the CPU 10 (YES route of step S1), a decision is made on whether or not being now in the middle of the firmware interchange (step S3). This decision depends upon viewing a flag in the variable table of the internal table area 42.

If not in the firmware interchange (NO route), as usual, the interruption control section 41 reads out a value to that I/O processing from the pointer table of the internal table area 42, and further reads out a function (I/O processing section) at the offset position corresponding to that value, thus conducting processing for the I/O (step S4).

If being in the firmware interchange (YES route of step S3), the interruption control section 41 informs the CPU 10 of being the busy condition by giving a busy signal as a reply thereto (step S5). At this time, the report on the busy condition to the CPU 10 is put in the internal table area 42 (step S6).

When the magnetic disk control unit 20 starts after the completion of the firmware interchange, the control shifts from the interruption control section 41 to the aforesaid ready-condition processing section. At this time, by referring to the internal table area 42, a decision is made on whether or not the reply by the busy signal is given during the firmware interchange, and only on the occurrence of a replay by the busy signal, a CUEND signal is forwarded to the CPU 10 to make a report to the effect of its being released from the busy condition.

Now, a description will be given hereinbelow of a prior procedure to be taken for when the magnetic disk control unit 20 having the above-mentioned interruption control section 41(CA 21) makes the active-interchange between firmwares.

For the start of the active-interchange, a flag indicative of being in the middle of the firmware interchange is set in the internal table area 42, and all the I/O from the CPU 10, already cued in the interruption control section 41, are put into processing.

Following this, the firmware control section 43 of the CA 21 is interchanged with all the firmwares (DA 23, CFE 24 and RM 25) other than the CA 21.

At this time, since the interruption control section 41 is required to make a busy reply to the CPU 10 issuing the I/O during the firmware interchange for the active-interchange, difficulty is encountered to replace the interruption control section 41. In addition, since the internal table area 422 retains the data (the aforesaid areas mentioned with the items (1) to (3)) necessary before and after the firmware interchange so that partial interchange is impossible, the interchange of the internal table area 42 is also difficult.

As mentioned above, in the middle of the firmware interchange (while the flag indicating that the firmware is in interchange is set), on transmission of an I/O from the CPU 10, the interruption control section 41 offers a busy response to the CPU 10. Whereupon, the firmware interchange is feasible in a state where the on-line condition between the CPU 10 and the magnetic disk control unit 20 remains.

On completion of the firmware interchange, the flag for indicating that the firmware is in interchange (which will sometimes referred hereinafter to as firmware-in-interchange) is released from the setting, and subsequently, the magnetic disk control unit 20 starts and sends a CUEND signal to the CPU 10 to make a report to the effect of being released from the busy condition, before restarting the ordinary operation.

In the prior firmware active-interchange method, as mentioned above, the interruption control section 41 needs to operate using the data of the internal table area 42 during the active interchange, besides the internal table area 42 needs to keep the data necessary before and after the interchange, and therefore, difficulty is encountered to accomplish the active-interchange of the interruption control section 41 and the internal table area 42.

For instance, where there is a need to interchange the interruption control section 41 or the internal table area 42 because of the presence of a bug, in the case of adding new data to the internal table area 42 for addition of a function, in the case of removing given data from the internal table area 42 for abandonment of a function, or when an alteration of a program occurs due to a change of a format, the prior firmware active-interchange method cannot cope with these events.

More specifically, in interchange the interruption control section 41 or the internal table area 42 in these cases, it becomes impossible to give a busy signal as a reply to the CPU 10, and therefore, there is no alternative but establishing the off-line condition between the CPU 10 and the magnetic disk control unit 20. However, even in the aforesaid cases, the system with the magnetic disk control unit 20 is required to certainly operate for 24 hours.

As an example in which a need for the addition of new data to the internal table area 42 exists, there is the case that the number of the magnetic disk units 30 connectable to the magnetic disk control unit 20 increases because of alteration of the system specification.

On the other hand, the interchange of the firmware control section 43 can cause a change of the addresses to the functions therein. In this case, naturally, there is a need to change the values held in the pointer table of the internal table area 42. To meet this requirement, in the prior art, the pointer table of the internal table area 42 is rewritten and updated in a state where the interruption control section 41 makes the busy response to the CPU 10. There is an additional problem which arises with the prior firmware active-interchange method, however, in that its firmware active-interchange takes longer time because of conducting such an updating operation.

SUMMARY OF THE INVENTION

The present invention has been developed with a view to eliminating these problems, and it is therefore an object of this invention to provide a magnetic disk control unit and a firmware active-interchange method which are capable of accomplishing the active-interchange of all firmwares organizing the magnetic disk control unit to permit the operation of a system including the magnetic disk control unit for 24 hours and further of making rewrite and updating of a pointer table and others unnecessary to reduce the time required for the active-interchange of the firmwares.

For achieving this purpose, in accordance with this invention, a magnetic disk control unit has an active-interchange function to interchange a firmware while operating in connection with a host unit, wherein the firmware includes an internal table area for retaining various data necessary for control, a save area for temporarily saving, of the data in the internal table area, data necessary before and after firmware interchange during the firmware active-interchange, a first interruption control section having, as interruption handling functions, a normal function to refer to the internal table area in accordance with an interruption for advancing to processing to the interruption and a busy response function to perform a busy response to the host unit during firmware active-interchange, and a second interruption control section having, as an interruption handling function, only a busy response function to accomplish a busy response to the host unit during the firmware active-interchange.

With this arrangement, during the firmware active-interchange, after the data of the internal table area necessary before and after the firmware interchange is temporarily saved into the save area, the busy response function of the second interruption control section is used for the interchange of portions other than the second interruption control section and the internal table area while the busy response function of the first interruption control section is employed for the interchange of the second interruption control section and the save area, with the result that the active interchange of all the firmwares constituting the magnetic disk control unit becomes feasible.

In addition, since the active interchange of the internal table area is possible, this arrangement can readily cope with the interchange resulting from bugs, the addition/deletion of functions, change of formats and others, and further, can make the rewrite and updating of a pointer table and others after the firmware interchange unnecessary at the employment of function pointer control.

Meanwhile, a firmware active-interchange method for a magnetic disk control unit according to this invention is for, in the magnetic disk control unit having an active-interchange function to interchange a firmware while operating in connection with a host unit, accomplishing the active interchange of the firmware, wherein the firmware is constructed to include an internal table area for retaining various data necessary for control, a save area for temporarily saving, of the data in the internal table area, data necessary before and after firmware interchange during the firmware active-interchange, a first interruption control section having, as interruption handling functions, a normal function to refer to the internal table area in accordance with an interruption for advancing to processing to the interruption and a busy response function to perform a busy response to the host unit during firmware active-interchange, and a second interruption control section having, as an interruption handling function, only a busy response function to accomplish a busy response to the host unit during the firmware active-interchange, and after the data of the internal table area necessary before and after the firmware interchange is temporarily saved into the save area in a state where the first interruption control section performs interruption processing, the switching from the interruption processing by the first interruption control section to interruption processing by the second interruption control section occurs, and further, after portions other than the second interruption control section and the save area are interchanged in a state where the second interruption control section conducts the interruption processing, the switching from the interruption processing by the second interruption control section to interruption processing by a new first interruption control section after the interchange occurs, and the data temporarily saved into the save area is restored in a given area of a new internal table area after the interchange in a state where the new first interruption control section conducts the interruption processing.

Besides, it is also appropriate that, after the data in the save area is restored in the given area of the new internal table area, the interchange of the second interruption control section is done in a state where the new first interruption control section conducts interruption processing, or it is also possible to interchange the save area.

In addition, it is also appropriate that the data to be temporarily saved from the internal table area into the save area includes information indicative of a version of the firmware before the interchange. In this case, when the data temporarily saved into the save area is restored in the given area, the re-disposition of the data to a table structure of the internal table area in the new firmware can be done on the basis of the version information saved into the save area and version information on the new firmware after the interchange.

The above-mentioned firmware active-interchange method according to this invention allows the active-interchange of all the firmwares constituting the magnetic disk control unit.

Furthermore, the active interchange of the internal table area can easily deal with the interchange resulting from bugs, the addition/deletion of functions, change of formats and others, and can make the rewrite and updating of a pointer table and others after the firmware interchange unnecessary when the magnetic disk control unit employs function pointer control.

Still further, if the version information is temporarily saved into the save area and the re-disposition or re-arrangement of data to a table structure is conducted on the basis of that version information and version information on a new firmware after the interchange, then the data updating for a new internal table area is effectively achievable.

Thus, employing the magnetic disk control unit and the firmware active-interchange method according to this invention allows the active interchange of all the firmwares organizing the magnetic disk control unit, so that a system equipped with the magnetic disk control unit can surely operate for 24 hours.

At this time, because of the active interchange of the internal table area, it is possible to easily cope with the interchange resulting from bugs, the addition/deletion of functions, change of formats and others.

In addition, the active interchange of the internal table area can make the rewrite and updating of a pointer table and others after the firmware interchange unnecessary when the magnetic disk control unit employs function pointer control, thereby reducing the time required for the active-interchange of the firmwares.

Moreover, since the data re-disposition to a table structure can be done on the basis of the version information before the interchange and the new firmware version information after the interchange, effective data updating for the new internal table area becomes possible, which can contribute to the further reduction of the time needed for the firmware active-interchange.

DESCRIPTION OF THE PREFERRED EMBODIMENTS

Figure 1:
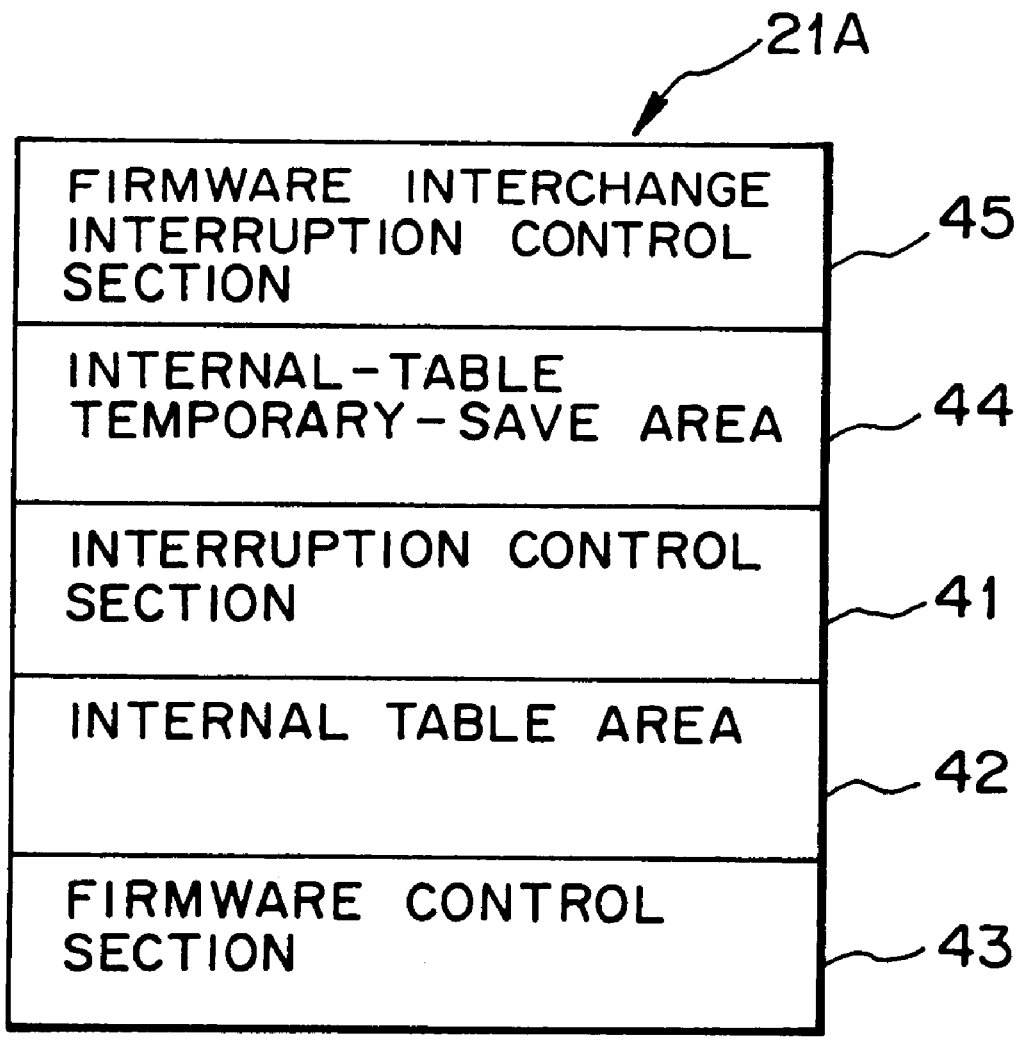
FIG. 1 is an illustration of a firmware structure in a magnetic disk control unit (CA) according to an embodiment of the present invention.

Referring to the drawings, a description will be made hereinbelow of an embodiment of the present invention.

Figure 2:
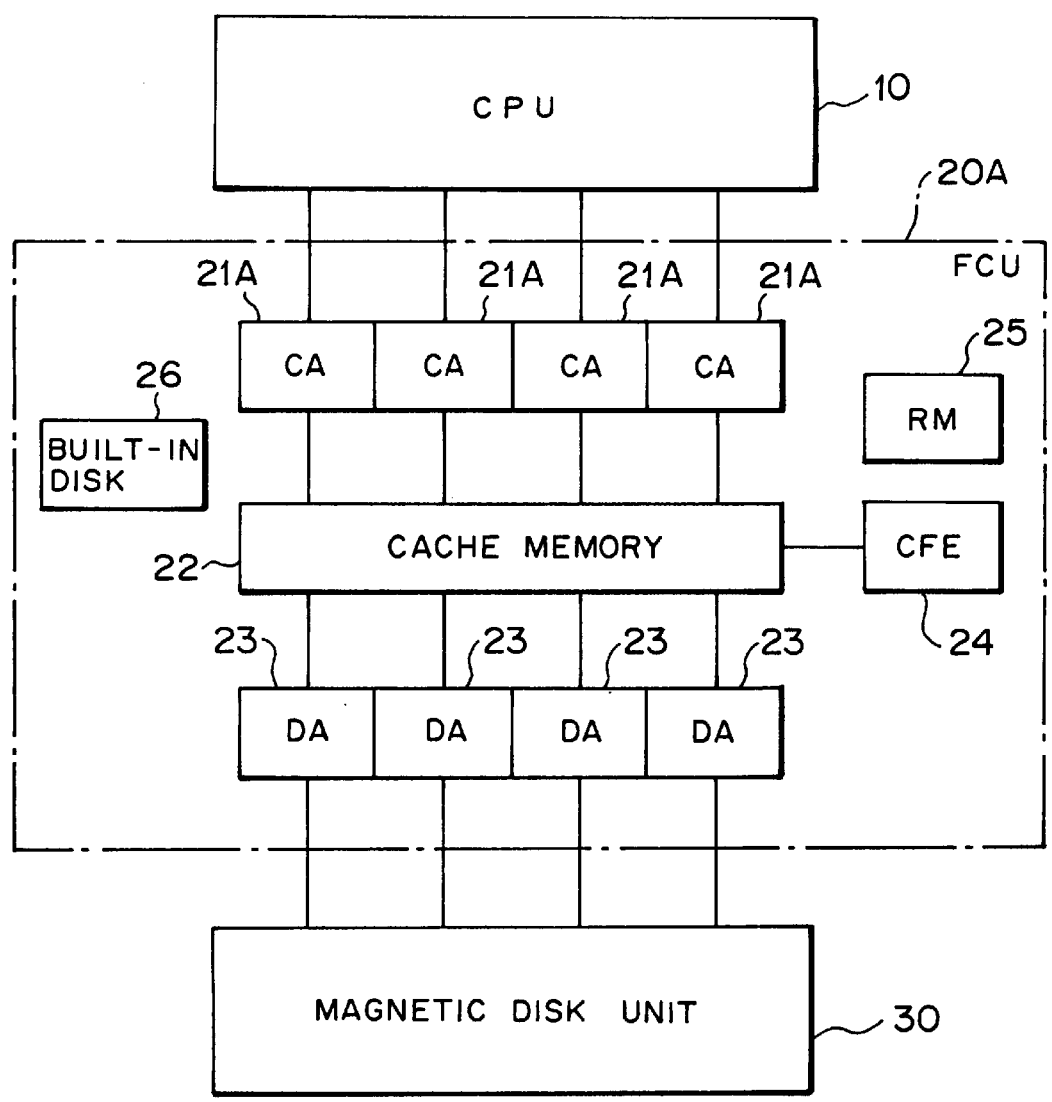
FIG. 2 is a block diagram showing an arrangement of the magnetic disk control unit according to this embodiment and an arrangement of a system equipped with the magnetic disk control unit.

First of all, with reference to FIG. 2, a description will be made hereinbelow of an arrangement of a magnetic disk control unit according to this embodiment, and further, of an arrangement of a system including the same magnetic disk control unit. In FIG. 2, the same numerals as those mentioned above signify the same or corresponding parts, and the detailed description thereof will be omitted for brevity.

As shown in FIG. 2, a magnetic disk control unit (FCU) 20A according to this embodiment is also put between a CPU 10 being a host unit and a magnetic disk unit 30, and is for executing write/read control in/from the magnetic disk unit 30 in accordance with an I/O from the CPU 10.

Figure 10:
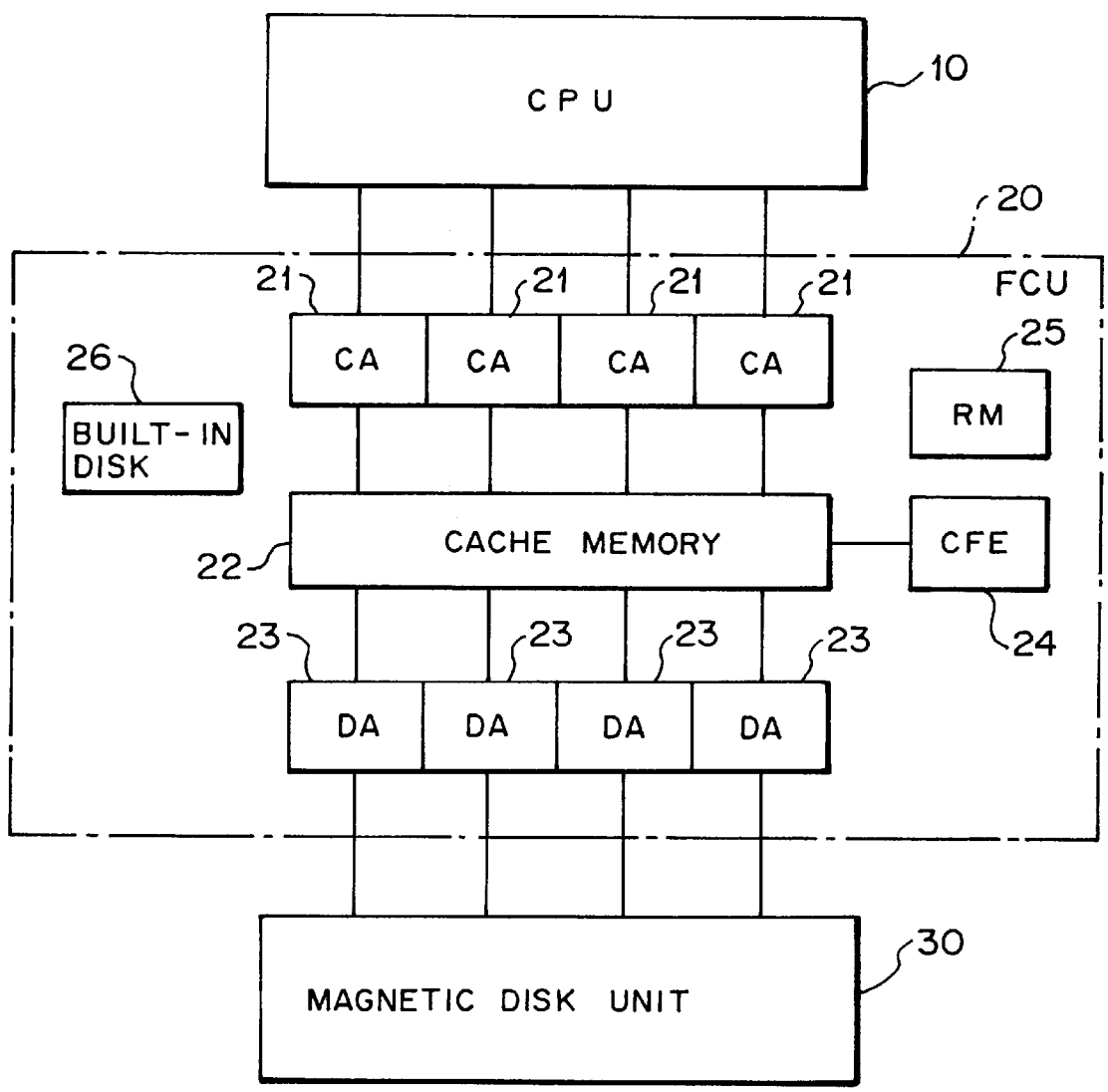
FIG. 10 is a block diagram showing an arrangement of a common magnetic disk control unit and a construction of a system equipped with the magnetic disk control unit.

Furthermore, in the magnetic disk control unit 20A according to this embodiment contains, in addition to a cache memory 22, DAs 23, a CFE 24, a RM 25 and a built-in disk 26 which have the same structures as those shown in FIG. 10, CAs (Channel Adapter) 21A forming a characteristic of this invention. The cache memory 22, the DAs 23, the CFE 24, the RM 25 and the built-in disk 26 function as mentioned with reference to FIG. 10, and hence, these will be removed from the following description.

As well as the CAs 21 shown in FIG. 10, the CAs 21A in this embodiment are provided at every channel for connection between the CPU 10 and the magnetic disk control unit 20A, and conduct processing to an I/O (interruption) from the CPU 10 or an interruption taking place within the magnetic disk control unit 20A. A firmware structure of the CA 21A in this embodiment is as shown in FIG. 1. In FIG. 2, as an example, four channels (paths) exist between the CPU 10 and the magnetic disk control unit 20A.

Figure 11:
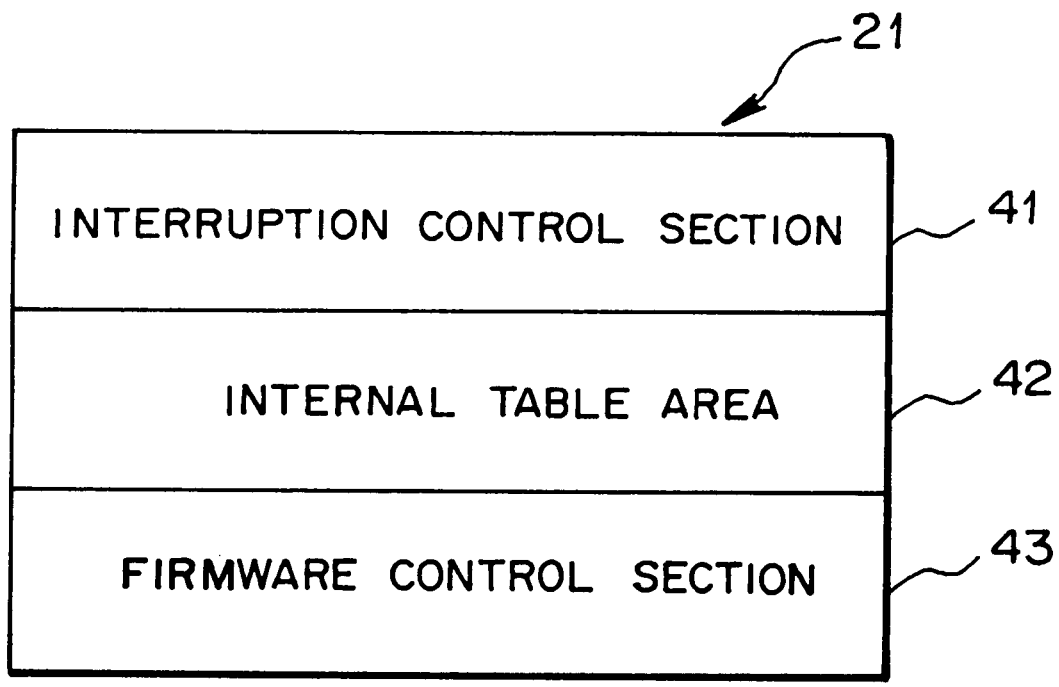
FIG. 11 is an illustration of a prior structure of a firmware (CA) constituting a magnetic disk control unit.

As illustrated in FIG. 1, in the magnetic disk control unit 20A according to this embodiment, a firmware in the CA 21A has an interruption control section (first interruption control section) 41, an internal table area 42 and a firmware control section 43, which are similar to those in FIG. 11, and further, includes an internal-table temporary-save area 44 and a firmware interchange interruption control section (second interruption control section) 45.

Figure 12:
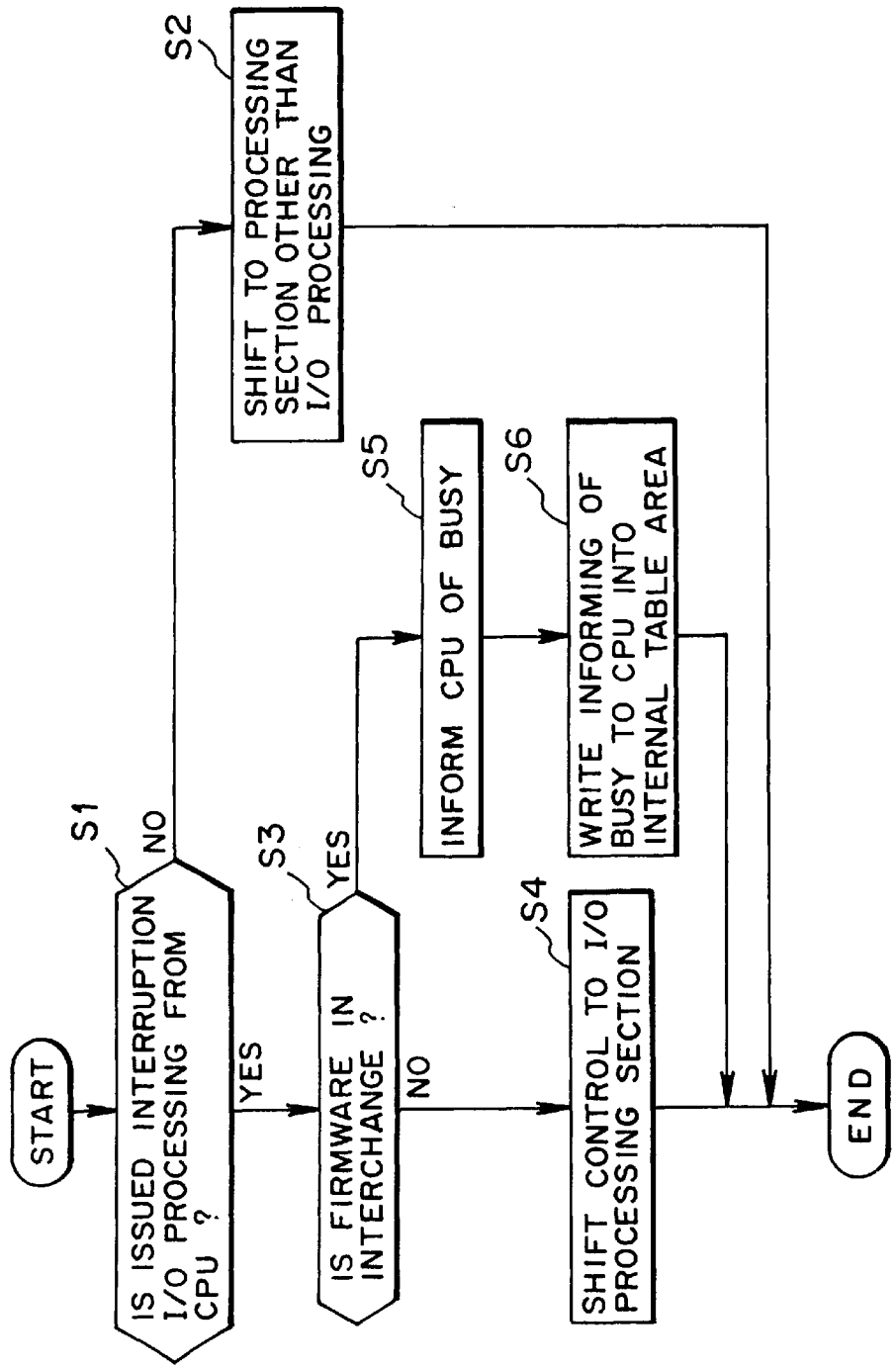
FIG. 12 is a flow chart for describing a general operation of an interruption control section (first interruption control section) of a magnetic disk control unit.

In this arrangement, the interruption control section (first interruption control section) 41 fulfills the same function as that shown in FIG. 11, that is, has, as an interruption function, a normal function to refer to the internal table area 42 in accordance with an interruption (an I/O from the CPU 10, a communication between functional modules within the magnetic disk control unit 20A, and others) to shift to processing to that interruption and a busy response function to do a busy response to the CPU 10 during firmware active-interchange. This interruption control section 41 operates according to the FIG. 12 flow chart (steps S1 to S6) as mentioned before.

The internal table area 42 is, as well as that shown in FIG. 11, for keeping a variety of data the control needs, and contains a pointer table giving instructions as to addresses to various functions in the firmware control section 43 or a variable table retaining a variety of variables. The variable table involves areas, such as (1) an area (a flag representative of that a firmware is in interchange, and others) for indicating the situation the firmware itself is presently placed in, (2) an area for storing whether or not a busy signal is given as a replay to the CPU 10, (3) an area for preserving a path for the connection with the CPU 10 and a physical connection condition, and (4) an area for retaining data for each of the magnetic disk units to be connected to the magnetic disk control unit 20A. Even in this embodiment, the data remaining in the aforesaid areas (1) to (3) are required to be held at all times before and after the firmware interchange. In addition, in this embodiment, as the save data, included is version information on firmwares before interchange.

The firmware control section 43, as well as that shown in FIG. 11, serves as an area to preserve functions to be taken for the actual processing (access processing to an I/O, communication between functional modules, and other processing). In the case that function pointer control is executed in the CA 21A, the values corresponding to the offset positions of various functions held in the firmware control section 43 are retained in a pointer table of the internal table area 42. Further, the interruption control section 41 reads out a value to the interruption from the pointer table, and reads out a function (processing section) at the offset position corresponding to that value from the firmware control section 43 to carry out the processing to the interruption.

The internal-table temporary-save area 44 is for the purpose of temporarily saving, of the data preserved in the internal table area 42, the data (the data held in the above-mentioned areas (1) to (3) or version information on a firmware before interchange) necessary before and after firmware interchange while the firmware is in the active interchange.

The firmware interchange interruption control section (second interruption control section) 45 serves, as an interruption handling function, only a busy response function to return a busy response to the CPU 10. That is, when an I/O comes from the CPU 10 in a state of taking over the interruption processing from the interruption control section 41 during the firmware active-interchange, the interruption control section 45 replies with a busy signal to the CPU 10 and makes the busy signal reply to the CPU 10 appear in the internal table area 42.

An operation of this interruption control section 45 will be described hereinbelow with reference to the flow chart (step S11) of FIG. 3.

When in firmware interchange, since each firmware (functional module) constituting the magnetic disk control unit 20A naturally grasps the situation the firmware is in interchange, the possible interruption occurring during the firmware interchange is only an I/O from the CPU 10.

For this reason, on taking over the interruption processing from the interruption control section 41 during the firmware active-interchange, the interruption control section 45 always refer to the internal-table temporary-save area 44 in response to the issued interruption, i.e., an I/O from the CPU 10, and replies with a busy signal to the CPU 10 for informing of its being in a busy condition (step S11). At this time, that reply with the busy signal to the CPU 10 is temporarily written in the internal-table temporary-save area 44.

Besides, the information representative of the reply with the busy signal to the CPU 10 is necessary in returning a CUEND signal at the re-start of the unit 20A after the firmware active-interchange, and as mentioned before, it is temporarily written in the internal-table temporary-save area 44, and at data restoration which will be mentioned herein later, is written in a given area (the aforesaid area (2)) of the internal table area 42.

Figure 4:
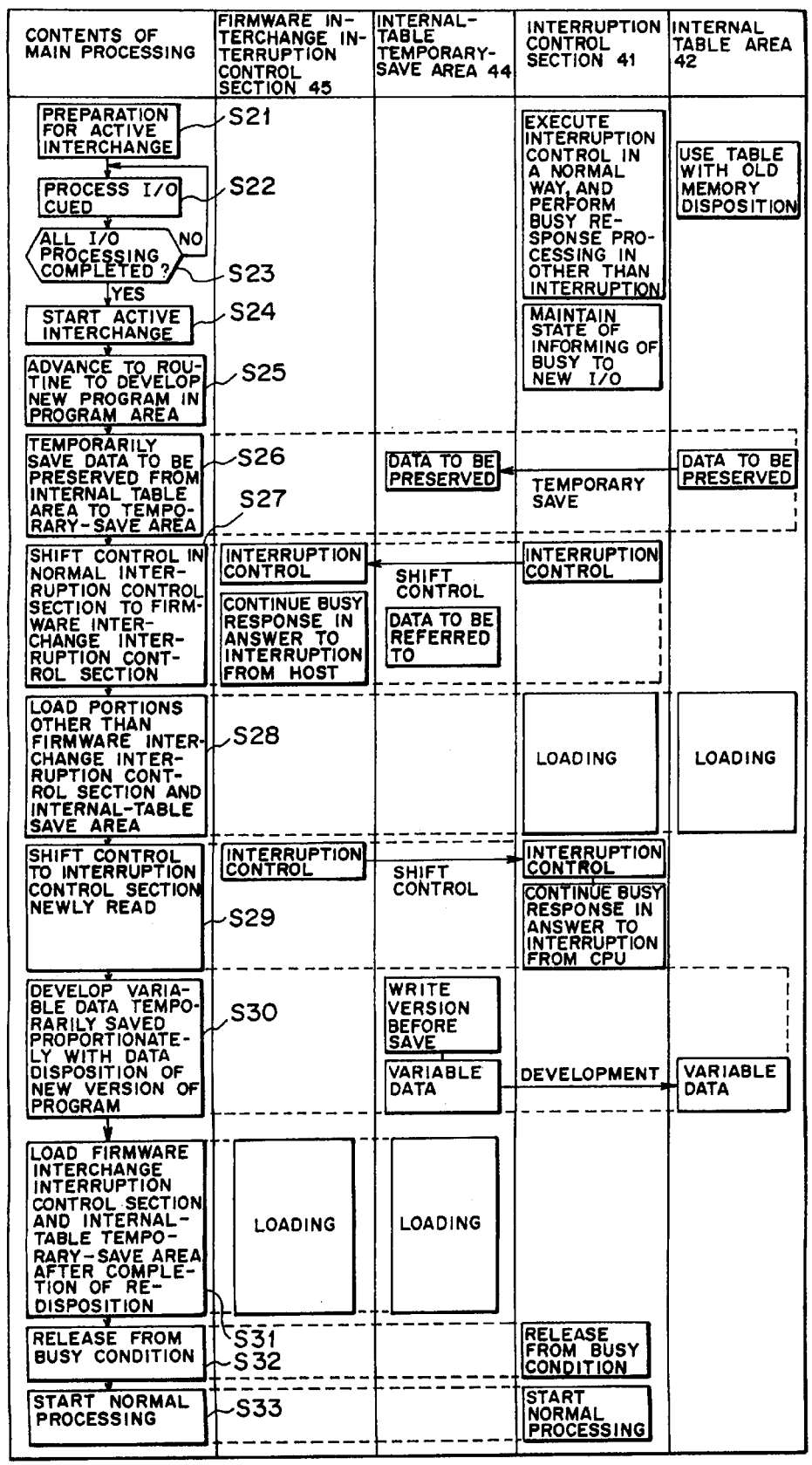
FIG. 4 is a flow chart available for describing a firmware active-interchange according to an embodiment of this invention.

Now, referring to the flow chart (steps S21 to S33) of FIG. 4, a description will be made hereinbelow of a procedure to be taken for the firmware active-interchange in the magnetic disk control unit 20A equipped with the above-mentioned CAs 21A (internal-table temporary-save area 44 and the firmware interchange interruption control section 45).

For the start of the active interchange, a flag indicative of the fact that the firmware is under interchange is first set in the internal table area 42 (preparation for active interchange; step S21), then followed by processing all the I/O from the CPU 10 which are already cued in the interruption control section 41 (steps S22 and S23).

On the completion of the processing of all the I/O from the CPU 10 ("YES" route from step S23), the active interchange starts (step S24), and the operational flow advances to a routine for developing a new program in a program area (step S25), and subsequently proceeds to temporarily save the data necessary before and after the firmware interchange (that is, the data to be preserved; the data held in the aforesaid areas (1) to (3), or the version information on the firmware before interchange) from the internal table area 42 into the internal-table temporary-save area 44 (step S26).

Incidentally, until the active interchange begins due to the "YES" decision in the step S23, the interruption control section 41 handles the interruption occurring within the magnetic disk control unit 20A as scheduled, whereas the busy response processing to a new I/O from the CPU 10 is out of the interruption processing. Further, until the save of the data to be preserved is completed in the step S26 after the start of the active interchange, the condition that the interruption control section 41 performs the busy response processing in relation to the new I/O from the CPU 10 remains. During the executions of the steps S21 to S26, a before-interchange table (a table with an old memory disposition) retained in the internal table area 42 is used as the variable table.

In response to the completion of the save of the data to be preserved, the portion for the interruption processing switches from the interruption control section 41 to the firmware interchange interruption control section 45 (step S27).

Although such switching and shifting between the control sections develop a time lag or interval, the time lag is less significant than the interface protocol. More specifically, when an MPU of the CA 21A switches the interruption control, the MPU stops for a moment, but the prolonged stopping time causes a possibility of establishing an off-line condition between the CPU 10 and the magnetic disk control unit 20A. Because the active interchange requires keeping the continuously coupled condition (on-line condition) between the CPU 10 and the CA 21A at all times, it is not desirable that the off-line condition occurs due to the switching of the interruption control. The result of the examination of the specification of a commonly used MPU by this inventor shows that the stopping interval caused by the interruption control switching in the MPU does not lead to the off-line condition according to the interface protocol.

Figure 3:
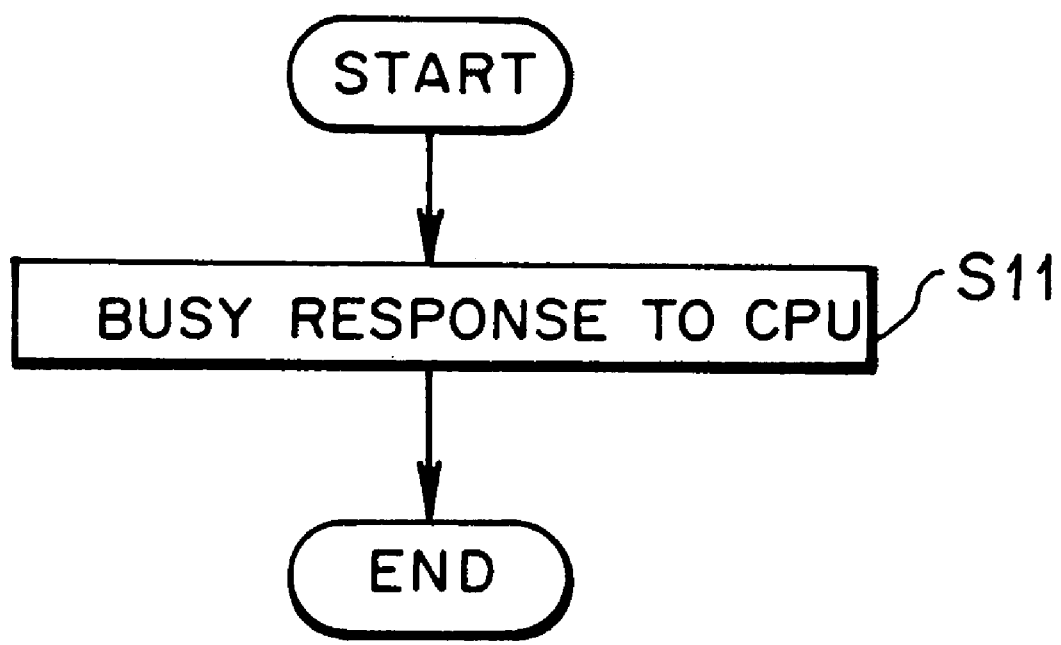
FIG. 3 is a flow chart useful for explaining an operation of a firmware interchange interruption control section (second interruption control section) in the magnetic disk control unit according to this embodiment.

After the interruption control switches from the interruption control section 41 to the firmware interchange interruption control section 45, this interruption control section 45, according to the flow chart (steps S11 and S12) of FIG. 3, refers to the data in the internal-table temporary-save area 44 to continue to make the busy response to a new interruption (I/O) from the CPU 10.

In a state where the interruption control section 45 conducts the interruption processing as mentioned above, conducting the loading of the portions (that is, the interruption control section 41, the internal table area 42 and the firmware control section 43 in the CA 21A, plus the DA 23, the CFE 24 and RM 25) other than the interruption control section 45 and the internal-table temporary-save area 44 accomplishes the interchange of these portions (step S28).

After the termination of the loading in the step S28, the interruption control again switches from the firmware interchange interruption control section 45 to a new interruption control section 41 after the interchange (step S29). Whereupon, the new interruption control section 41, according to the flow chart shown in FIG. 12, refers to the data in the internal table area 42 to continue to do the busy response to a new interruption (I/O) from the CPU 10.

Following this, in a state where the new interruption control section 41 performs the interruption processing (busy response processing), the variable data temporarily saved into the internal-table temporary-save area 44 is developed in a new internal table area 42 after the interchange proportionately with the data disposition of a new version of program, thus being restored in a given area thereof (step S30). At this time, used is a development processing section of a new firmware control section 43 after the interchange.

Figure 5:
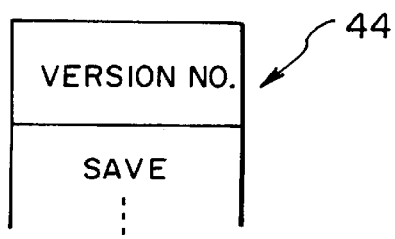
FIG. 5 is an illustration of a structure of an internal table temporary-save area in this embodiment.

Besides, as shown in FIG. 5, the firmware version information before the interchange (version number before the save) is written in the head of the variable data in the internal-table temporary-save area 44. A way for the data re-disposition (development) to be conducted using this version information will be described herein later with reference to FIGS. 6A to 8.

After the completion of the saved data redisposition, through the loading of the internal-table temporary-save area 44 and the firmware control section 45, the interchange of these portions is done (step S31). Even in the meantime, the new interruption control section 41 conducts the interruption processing (busy response processing).

After the end of the loading in the step S31 (that is, after the completion of the firmware interchange), the flag indicative of the fact that the firmware is under interchange is released from the setting in the internal table area 42, and after the busy condition is released with respect to the CPU 10 (step S32), the magnetic disk control unit 20A after the firmware interchange is started so that the interruption control section 41 sends a CUEND signal to the CPU 10 to inform it of the release from the busy condition, and then the normal processing resumes (step S33).

Thus, while the on-line condition is established between the CPU 10 and the magnetic disk control unit 20A (that is, during the operation in a state of connection with the CPU 10), the interchange of all the firmwares organizing the magnetic disk control unit 20A becomes feasible.

Secondly, referring again to FIGS. 6A to 8, a description will be given herinbelow of a concrete example of re-disposition of the data saved, to be conducted in the aforesaid step S30.

Figure 6A:
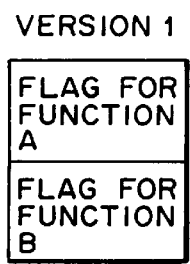
FIGS. 6A to 6C illustrate updating examples of a table structure (version-up examples), respectively.
Figure 6B:
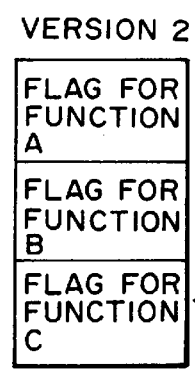
Figure 6C:
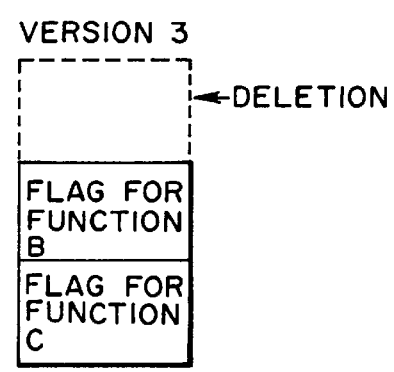

In the description here, let it be assumed that the save data are taken to be control flags for turning on/off three kinds of functions A to C, and the firmware updating (version-up) is done in the order of "Version 1", "Version 2", and "Version 3". FIGS. 6A to 6C illustrate table structures of the save data in these versions, respectively. As shown in FIGS. 6A to 6C, the feature of the table structure in the "Version 2" is the addition of the flag for the function C to the table structure in the "Version 1", while the feature of the table structure in the "Version 3" is the subtraction of the flag for the function A from the table structure in the "Version 2". That is, the "Version 1" is set to be able to use the functions A and B; the "Version 2" is set to be able to use the functions A, B and C; and the "Version 3" is available in the functions B and C.

Figure 7:
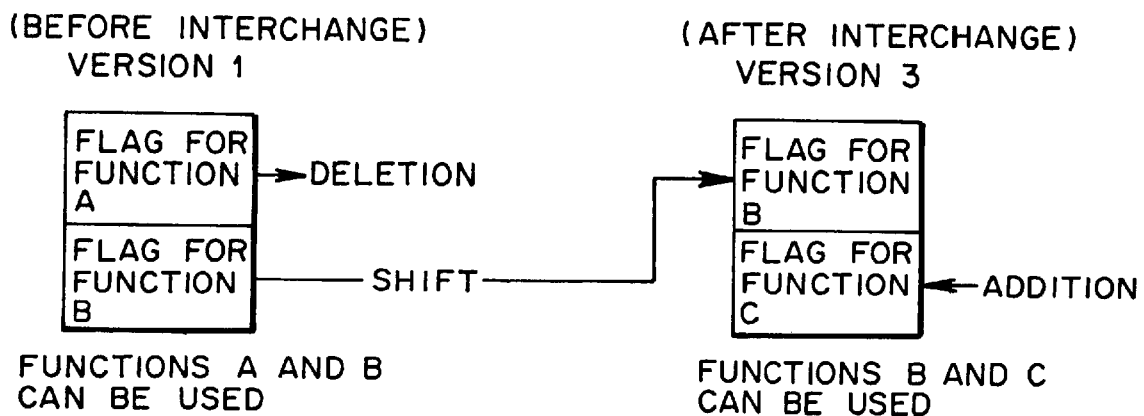
FIG. 7 shows one example of data re-disposition to version information in this embodiment.

For instance, in case where the interchange of the firmware is made from the "Version 1" to the "Version 3" [where the data before the active interchange, temporarily saved, is as shown in FIG. 6A and the data to be re-disposed after the interchange is as shown in FIG. 6C], since the firmware in the "Version 3" grasps the development mode of the "Version 2", as shown in FIG. 7, the data re-disposition is made to reflect the flag for the function A deleted at the step of updating from the "Version 2" to the "Version 3" and the flag for the function C added at the step of updating from the "Version 1" to the "Version 2". That is, the data redisposition proportionate to the table structure in an internal table area 42 of a new firmware is made on the basis of the version information "Version 1" saved in the internal-table temporary-save area 44 and the version information "Version 3" in the new firmware after the interchange. Whereupon, after the active interchange, the functions B and C can be put to use.

Figure 8:
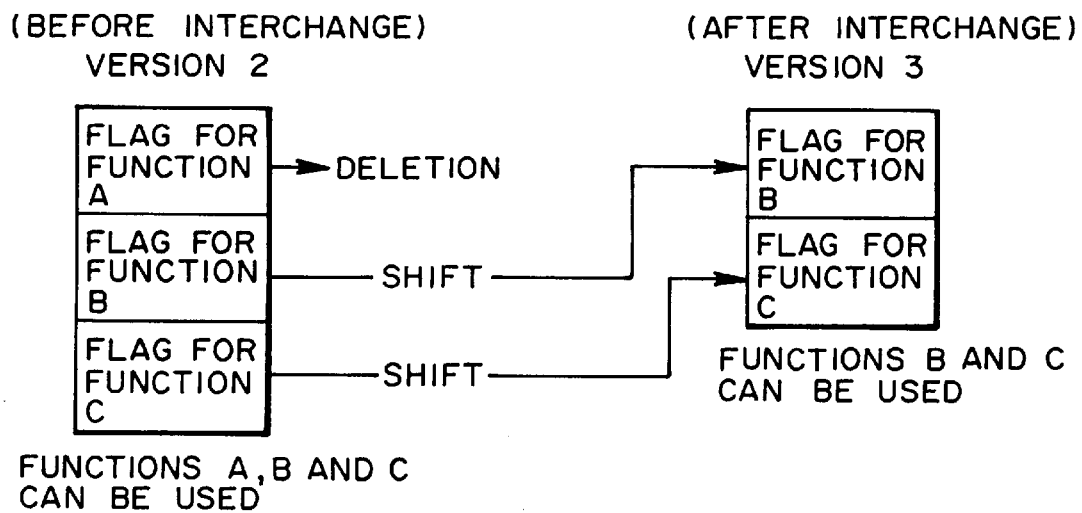
FIG. 8 shows another example of data redisposition to version information in this embodiment.

Likewise, for instance, in the case of switching the firmware from the "Version 2" to the "Version 3" [where the data before the active interchange, temporarily saved, is as shown in FIG. 6B and the data to be re-disposed after the interchange is as shown in FIG. 6C], as shown in FIG. 8, the data re-disposition is done in a manner of deleting the flag for the function A in the step of updating from the "Version 2" to the "Version 3" while directly shifting the flags for the functions B and C. That is, the data re-disposition proportionate to the table structure in an internal table area 42 of a new firmware is made on the basis of the version information "Version 2" saved in the internal-table temporary-save area 44 and the version information "Version 3" in the new firmware after the interchange. Whereupon, after the active interchange, the functions B and C can be put to use.

Thus, the embodiment of this invention permits the active interchange of all the firmwares constituting the magnetic disk control unit 20A, with the result that it is possible to certainly run a system including the magnetic disk control unit 20A for 24 hours.

In addition, the active interchange of the internal table area 42 possible can readily cope with the interchange caused by bugs, the addition/deletion of functions, change of formats, and others.

Moreover, the active interchange of the internal table area 42 possible can make the rewrite and updating of a pointer table and others after the firmware interchange unnecessary when the magnetic disk control unit 20A employs function pointer control, which can significantly shorten the time required for the firmware active-interchange.

Figure 9:
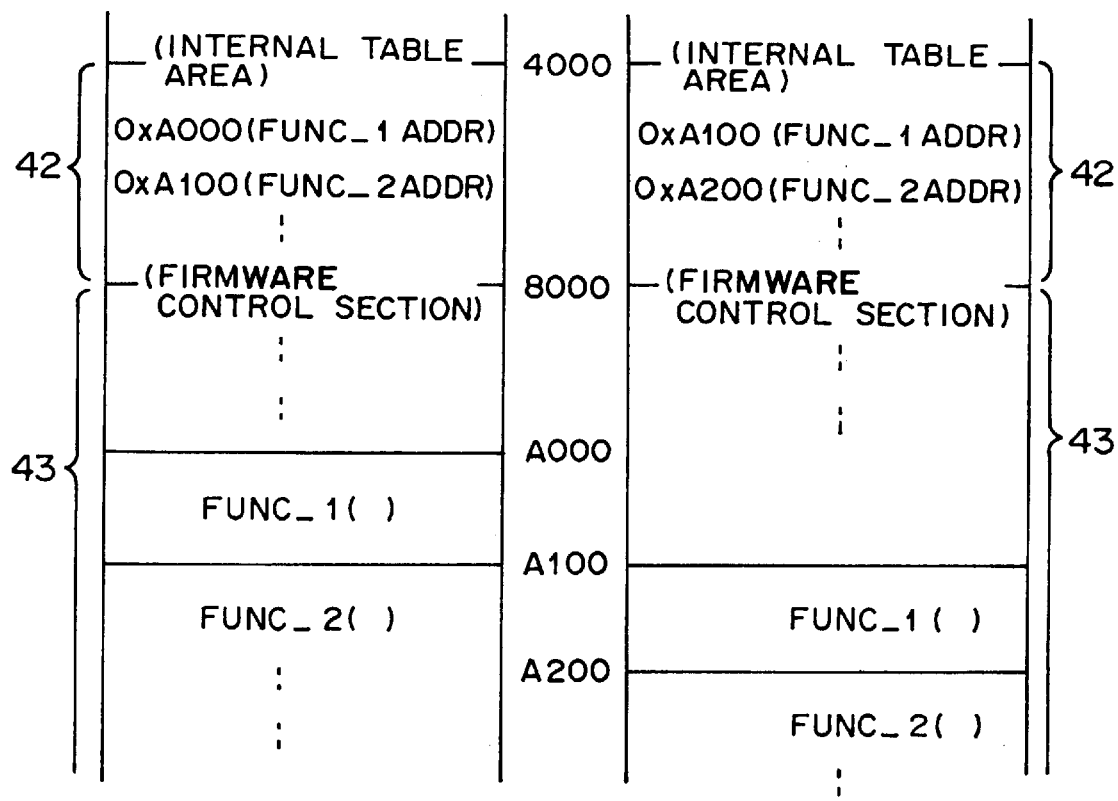
FIGS. 9A and 9B are illustrations of a concrete example of an internal table area/firmware control section before and after firmware interchange.

For instance, in the case that a firmware (internal table area 42/firmware control section 43) shown in FIG. 9A is interchanged with a firmware shown in FIG. 9B, since the addresses to functions func__1() and func__2() change before and after the interchange, as mentioned before, the prior method requires the change and updating of the values (addresses) preserved in the pointer table of the internal table area 42 after the firmware interchange. On the other hand, in the active-interchange method according to this embodiment, the internal table area 42, together with the firmware control section 43, is concurrently and entirely read out to undergo the interchange, so that the rewrite and updating of the pointer table and others after the firmware interchange becomes unnecessary.

Still further, as mentioned before with reference to FIGS. 5 to 8, since the data re-disposition proportionate to the table structure is possible on the basis of the version information before the interchange and version information on a new firmware after the interchange, effective data updating for the new internal table area 42 is feasible, which can further reduce the time needed for the firmware interchange.

It should be understood that the present invention is not limited to the above-described embodiment, and that it is intended to cover all changes and modifications of the embodiment of the invention herein which do not constitute departures from the spirit and scope of the invention.

What is claimed is:

1. A magnetic disk control unit having an active-interchange function to interchange firmware while operating in connection with a high-order device, said firmware including:
    an internal table area for retaining various data necessary for controlling said firmware;
    a save area for temporarily saving said data in said internal table area, which data is to be needed before and after the interchange of said firmware during the active-interchange of said firmware;
    an interruption control section for selectively serving a normal function to handle a received interruption signal, by referring to said data stored in said internal table area, in accordance with the kind of interruption signal and a busy response function to output a busy signal, which is indicative of a busy status of a lower device, to said high-order device during the active-interchange of said firmware; and
    a firmware-interchange interruption control section dedicated for outputting the busy signal to said high-order device during active-interchange of said firmware.

2. A firmware active-interchange method for a magnetic disk control unit having an active-interchange function to interchange a firmware while operating in connection with a host unit, with said firmware including an internal table area for retaining various data necessary for control, a save area for temporarily saving, of said data in said internal table area, data necessary before and after interchange of said firmware while said firmware undergoes active-interchange, a first interruption control section serving, as interruption handling functions, a normal function to refer to said internal table area in accordance with an interruption for advancing to processing to said interruption and a busy response function to perform a busy response to said host unit during the firmware active-interchange, and a second interruption control section serving, as an interruption handling function, only a busy response function to accomplish a busy response to said host unit during the firmware active-interchange, said active-interchange method comprising the steps of:
    temporarily saving said data in said internal table area, necessary before and after the firmware interchange, into said save area in a state where said first interruption control section performs interruption processing;
    conducting switching from said interruption processing by said first interruption control section to interruption processing by said second interruption control section;
    interchanging portions other than said second interruption control section and said save area in a state where said second interruption control section conducts said interruption processing;
    conducting switching from said interruption processing by said second interruption control section to interruption processing by a new first interruption control section after the interchange; and
    restoring said data, temporarily saved into said save area, in a given area of a new internal table area after the interchange in a state where said new first interruption control section conducts interruption processing.

3. A firmware active-interchange method for a magnetic disk control unit as defined in claim 2, further comprising:
    after said data in said save area is restored in said given area of said new internal table area, interchanging said second interruption control section in a state where said new first interruption control section conducts said interruption processing.

4. A firmware active-interchange method for a magnetic disk control unit as defined in claim 2, further comprising:
    after said data in said save area is restored in said given area of said new internal table area, interchanging said save area in a state where said new first interruption control section conducts said interruption processing.

5. A firmware active-interchange method for a magnetic disk control unit as defined in claim 3, further comprising:
    after said data in said save area is restored in said given area of said new internal table area, interchanging said save area in a state where said new first interruption control section conducts said interruption processing.

6. A firmware active-interchange method for a magnetic disk control unit as defined in claim 2, wherein said data to be temporarily saved from said internal table area into said save area includes information indicative of a version of said firmware before the interchange.

7. A firmware active-interchange method for a magnetic disk control unit as defined in claim 3, wherein said data to be temporarily saved from said internal table area into said save area includes information indicative of a version of said firmware before the interchange.

8. A firmware active-interchange method for a magnetic disk control unit as defined in claim 4, wherein said data to be temporarily saved from said internal table area into said save area includes information indicative of a version of said firmware before the interchange.

9. A firmware active-interchange method for a magnetic disk control unit as defined in claim 5, wherein said data to be temporarily saved from said internal table area into said save area includes information indicative of a version of said firmware before the interchange.

10. A firmware active-interchange method for a magnetic disk control unit as defined in claim 6, wherein, when said data temporarily saved into said save area is restored in said given area, said data is re-disposed proportionately with a table structure of said internal table area in said new firmware on the basis of said version information saved into said save area and version information on said new firmware after the interchange.

11. A firmware active-interchange method for a magnetic disk control unit as defined in claim 7, wherein, when said data temporarily saved into said save area is restored in said given area, said data is re-disposed proportionately with a table structure of said internal table area in said new firmware on the basis of said version information saved into said save area and version information on said new firmware after the interchange.

12. A firmware active-interchange method for a magnetic disk control unit as defined in claim 8, wherein, when said data temporarily saved into said save area is restored in said given area, said data is re-disposed proportionately with a table structure of said internal table area in said new firmware on the basis of said version information saved into said save area and version information on said new firmware after the interchange.

13. A firmware active-interchange method for a magnetic disk control unit as defined in claim 9, wherein, when said data temporarily saved into said save area is restored in said given area, said data is re-disposed proportionately with a table structure of said internal table area in said new firmware on the basis of said version information saved into said save area and version information on said new firmware after the interchange.

* * * * *